US012109675B2

(12) United States Patent
Carrier

(10) Patent No.: US 12,109,675 B2
(45) Date of Patent: Oct. 8, 2024

(54) GAS SPRING FASTENER DRIVING TOOL WITH REMOVABLE END CAP FOR PERFORMING MAINTENANCE OR SERVICE

(71) Applicant: Kyocera Senco Industrial Tools, Inc., Cincinnati, OH (US)

(72) Inventor: Alexander L. Carrier, Columbus, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 289 days.

(21) Appl. No.: 17/737,591

(22) Filed: May 5, 2022

(65) Prior Publication Data

US 2022/0355460 A1 Nov. 10, 2022

Related U.S. Application Data

(60) Provisional application No. 63/185,516, filed on May 7, 2021.

(51) Int. Cl.

| | |
|---|---|
| ***B25F 5/02*** | (2006.01) |
| ***B25C 1/00*** | (2006.01) |
| ***B25C 1/04*** | (2006.01) |

(52) U.S. Cl.

CPC ................ *B25F 5/02* (2013.01); *B25C 1/008* (2013.01); *B25C 1/047* (2013.01)

(58) Field of Classification Search

CPC ............ B25F 5/02; B25C 1/008; B25C 1/047

See application file for complete search history.

(56) References Cited

U.S. PATENT DOCUMENTS 2,872,901 A * 2/1959 Goldring ................. B25C 1/041 91/417 R 3,081,741 A * 3/1963 Goldring ................. B25C 1/041 91/417 R (Continued)

FOREIGN PATENT DOCUMENTS

CN 104612386 A * 5/2015 ............... B25C 1/04

CN 105382764 A * 3/2016

(Continued)

OTHER PUBLICATIONS

International Search Report, PCT/US22/27841, 8 pages (Aug. 2, 2022).

(Continued)

*Primary Examiner* — Lucas E. A. Palmer

(74) *Attorney, Agent, or Firm* — Frederick H. Gribbell; Russell F. Gribbell; William E. Crouse

(57) ABSTRACT

A cordless, hoseless fastener driver tool with a compressed gas pressure chamber has a removable end cap that is securely attached to the tool via four screws. Removing each screw in succession releases the compressed gas in a controlled manner, which then allows a user to safely remove the end cap to access the interior of the tool. The user can perform a maintenance procedure and service the interior mechanical portions of the tool, such as repairing or replacing a driver, a piston, and/or a piston stop, as well as the cylinder sleeve, or other internal components. Once the end cap is removed, the components listed above can be removed (and replaced) without the use of any further tools.

15 Claims, 11 Drawing Sheets

(56) References Cited

U.S. PATENT DOCUMENTS

| | | | | |
|---|---|---|---|---|
| 3,427,928 | A * | 2/1969 | Bade | B25C 1/043 91/308 |
| 3,895,562 | A * | 7/1975 | El Guindy | B25C 1/041 91/308 |
| 4,215,808 | A | 8/1980 | Sollberger | |
| 4,401,251 | A | 8/1983 | Nikolich | |
| 5,715,986 | A * | 2/1998 | Sauer | B25C 1/042 227/130 |
| 10,173,310 | B2 | 1/2019 | Wyler | |
| 11,273,545 | B2 | 3/2022 | Ueda | |
| 2004/0020964 | A1* | 2/2004 | Lee | B25C 1/042 227/130 |
| 2005/0001007 | A1 | 1/2005 | Butzen | |
| 2006/0180631 | A1 | 2/2006 | Pedicini | |
| 2006/0249554 | A1 | 11/2006 | Butzen | |
| 2011/0012446 | A1* | 1/2011 | Maute | H02K 7/145 310/50 |
| 2012/0160936 | A1* | 6/2012 | Brummitt | B05C 17/00503 239/322 |
| 2017/0222382 | A1* | 8/2017 | Peloquin | H01R 27/02 |
| 2017/0297186 | A1* | 10/2017 | Meyer | B25F 5/02 |
| 2018/0001454 | A1 | 1/2018 | Jaskot | |
| 2018/0036870 | A1 | 2/2018 | Komazaki | |
| 2018/0126527 | A1 | 5/2018 | Pomeroy et al. | |
| 2018/0290279 | A1 | 10/2018 | Kobori | |
| 2019/0217460 | A1* | 7/2019 | Mahalingappa | B25F 5/001 |
| 2019/0255689 | A1 | 8/2019 | Leimbach et al. | |
| 2020/0215672 | A1 | 7/2020 | Pomeroy et al. | |
| 2020/0298382 | A1* | 9/2020 | Clark | B25B 23/045 |
| 2021/0237242 | A1* | 8/2021 | Carrier | B25C 1/047 |
| 2022/0080572 | A1* | 3/2022 | Carrier | B25C 7/00 |

FOREIGN PATENT DOCUMENTS

| | | | | |
|---|---|---|---|---|
| DE | 102021208040 | A1 * | 2/2022 | B25C 1/047 |
| JP | 2009023069 | A * | 2/2009 | B25B 21/00 |
| WO | WO-2005118228 | A1 * | 12/2005 | B25C 1/001 |

OTHER PUBLICATIONS

Bostitch Nailer Repair, 2 pages, dated Feb. 17, 2020, online at URL:https://www.youtube.com/watch?v=6clE-J_CPHI.

* cited by examiner

GAS SPRING FASTENER DRIVING TOOL WITH REMOVABLE END CAP FOR PERFORMING MAINTENANCE OR SERVICE

CROSS-REFERENCE TO RELATED APPLICATIONS

The present application claims priority to provisional patent application Ser. No. 63/185,516, titled "GAS SPRING FASTENER DRIVING TOOL WITH REMOVABLE END CAP FOR PERFORMING MAINTENANCE OR SERVICE," filed on May 7, 2021.

TECHNICAL FIELD

The technology disclosed herein relates generally to linear fastener driving tools and, more particularly, is directed to portable tools that drive staples, nails, or other linearly driven fasteners. At least one embodiment is disclosed as having a 'main' pressurized storage chamber (the 'pressure chamber') that is used in a linear fastener driving tool, in which a working cylinder that becomes filled with compressed gas is used to quickly force a piston through a driving stroke movement through the working cylinder, while also driving a fastener into a workpiece. The working cylinder is in fluidic communication (via an end cap) with the pressure chamber which holds most of the compressed gas that is used to "fire" the piston. The end cap also covers the top region of the working cylinder.

The end cap can be removed by a human user to obtain access to the interior parts of the working cylinder, if desired for repair or for replacement of worn or broken parts. When in use with the tool, the removable end cap is attached to the outer wall of the pressure chamber by multiple threaded screws, and the shapes of the end cap with its large O-ring seal, allows the pressurized gas to begin to safely escape while those screws are being loosened. By the time the final screw is loosened to the point where the end cap can be physically removed from the pressure chamber outer wall, the majority of the pressurized gas (i.e., above gauge pressure) will have been evacuated, and thus reduced to a safe pressure magnitude, so that the human user is not in danger of having any portions of the tool 'explode' in his face by a sudden unsafe discharge of that gas.

STATEMENT REGARDING FEDERALLY SPONSORED RESEARCH OR DEVELOPMENT

None.

BACKGROUND

Many conventional fastener driving tools use a piston to move a driver blade that forces a nail or staple into a target workpiece, as part of their operational cycle. These pistons are typically driven by compressed air, or in some cases, by combustion gases. In a product line of pressurized gas tools known as FUSION® that are sold by Senco, pressurized gas is stored in a main storage chamber and that gas is not vented to atmosphere, but instead is re-used multiple times, and can drive multiple driving strokes (including operational cycle counts in the thousands, per charge of pressurized gas).

Kyocera Senco Industrial Tools, Inc. ("Senco") sells a product line of automatic power tools commonly referred to as nailers, including tools that combine the power and the utility of a pneumatic tool with the convenience of a cordless tool. One primary feature of such tools is that they use pressurized gas to drive a piston that shoots the nail. In some Senco tools, that pressurized gas is re-used, over and over, so there is no need for any compressed gas hose, or for a combustion chamber that would require fuel.

Although Senco FUSION "air tools" are quite reliable and typically can endure thousands of shooting cycles without any significant maintenance, they do have wear characteristics for certain components. For example, after thousands of operations, the gas pressure inside the pressure chamber can slowly leak down to a pressure level that will need to be increased, or the tool will begin to fail to drive the fasteners successfully into their target workpiece. When that occurs, additional pressurized gas should be added into the pressure chamber. Moreover, if an "air tool" undergoes a mechanical failure (such as a jam), then the tool will often need to be disassembled—and that requires the pressurized gas to be bled off from the pressure chamber.

Another possibility is that the tool can become damaged, particularly when a fastener such as a nail becomes jammed while being driven by the driver blade, and in that situation, the tool may need to be opened to repair or replace the internal parts; or as a minimum, it needs to have the jammed nail removed from the driver track so that the tool can continue to be used by a human operator.

One conventional self-contained gas-spring tool is sold by Milwaukee Electric Tool Company, and to perform a maintenance procedure, one must first remove both housing halves to obtain access to its fill valve. That fill valve must be then actuated to release the internal gas pressure. Then the user must unthread the pressure vessel to obtain access to servicing either the piston stop (or "bumper") or the piston/driver blade combination. Of course, to reassemble the tool, the reverse procedure must be performed.

Another conventional self-contained gas-spring tool is sold by Hitachi, and to perform a maintenance procedure, one must first remove a plastic top cap by unscrewing four 'outer' screws, and then remove both housing halves. After that, the user must release the internal gas pressure by removing a protective screw that uncovers a Schrader fill valve, and then actuate that fill valve. The user must then remove four 'inner' screws to release a metal top cap. After all that has been accomplished, the user must still use a special wrench that is only available from Hitachi to unthread a special nut that covers the top of the pressure vessel. Finally, then, the user may obtain access to the pressure vessel to service either the piston stop or the combination piston and driver. Of course, to reassemble the tool, the reverse procedure must be performed.

SUMMARY

Accordingly, it is an advantage of the present technology disclosed herein to provide a fastener driving tool that operates on a gas spring principle, in which the end cap can be safely removed while simultaneously safely relieving the stored pressurized gas inside the tool.

It is another advantage of the present technology to provide a fastener driving tool that operates on a gas spring principle, in which the tool includes an end cap that is fastened to a main pressurized storage chamber using a set of fasteners that can be loosened in a controlled manner so as to release the internal gas pressure in a controlled manner that is safe for a normal human user without special fixtures, and thereby enabling that user to access the internal portions of the tool to perform a maintenance procedure, such as for repair or for replacement of worn parts, for example.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a method for servicing a fastener driving tool is provided, in which the method comprises the following actions: (a) providing an assembled fastener driving tool that includes: an outer housing; a working cylinder that includes a cylindrical sleeve and a movable piston therewithin; a storage chamber containing pressurized gas that is in fluidic communication with said working cylinder, said storage chamber having an outer wall; a movable driver that is in mechanical communication with said piston at least during a driving stroke; and an end cap that is attachable/detachable to/from said storage chamber proximal to a high pressure portion of the working cylinder of said fastener driving tool, said end cap being removably secured to said storage chamber by a plurality of fasteners; (b) carefully removing said end cap by loosening said plurality of fasteners in sequence, and evacuating said storage chamber to a safe pressure magnitude before the final one of said plurality of fasteners is removed; and (c) through an opening that is created by the removal of said end cap, without removing said outer housing, and without the use of any tool, directly accessing and removing at least one of: (i) said movable piston; (ii) said movable driver; and (iii) said sleeve of the working cylinder.

In accordance with another aspect, a method for servicing a fastener driving tool is provided, in which the method comprises the following actions: (a) providing an assembled fastener driving tool that includes: an outer housing; a working cylinder that includes a cylindrical sleeve and a movable piston therewithin; a storage chamber containing pressurized gas that is in fluidic communication with said working cylinder; a movable driver that is in mechanical communication with said piston at least during a driving stroke; an end cap that is attachable/detachable to/from said storage chamber proximal to a high pressure portion of the working cylinder of said fastener driving tool, said end cap being removably secured to said storage chamber by a plurality of fasteners; and a fill valve that is located in said end cap, said fill valve being accessible without removing any portion of said outer housing, said fill valve being in fluidic communication with said storage chamber, said fill valve being actuatable to release the pressurized gas from said storage chamber to the environment outside said fastener driving tool; (b) accessing and actuating said fill valve to vent the pressurized gas from said storage chamber to a safe pressure magnitude; (c) removing said end cap by loosening said plurality of fasteners in sequence, and evacuating any residual pressurized gas from said storage chamber to a safe pressure magnitude before the final one of said plurality of fasteners is removed; and (d) through an opening that is created by removing said end cap, without removing said outer housing, and without the use of any tool, directly accessing and removing at least one of: (i) said movable piston; (ii) said movable driver; and (iii) said sleeve of the working cylinder.

In accordance with yet another aspect, a fastener driving tool is provided, which comprises: (a) an outer housing; (b) a working cylinder that includes a cylindrical sleeve and a movable piston therewithin; (c) a storage chamber containing pressurized gas that is in fluidic communication with said working cylinder; (d) a movable driver that is in mechanical communication with said piston at least during a driving stroke; (e) a piston stop located at a distal end of said sleeve; (f) an end cap that is attachable/detachable to/from said storage chamber proximal to a high pressure portion of the working cylinder of said fastener driving tool; (g) a spacer that exhibits a plurality of spaced-apart protrusions, said spacer being mounted at a proximal end of said sleeve, wherein said proximal end of the sleeve is proximal to said end cap, and said spacer and protrusions being sized and shaped so as to hold said sleeve in a correct orientation with respect to said end cap; and (h) a mechanical bottom structure at a distal end of said working cylinder to which a distal end of the storage chamber is in mechanical communication with, and to which a distal end of the sleeve is in mechanical communication with, to thereby enclose said storage chamber to create a pressure vessel; wherein: a stack-up of said end cap, said spacer, and said sleeve holds the distal end of the sleeve in mechanical communication with said bottom structure of the working cylinder, without the use of internal fasteners.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
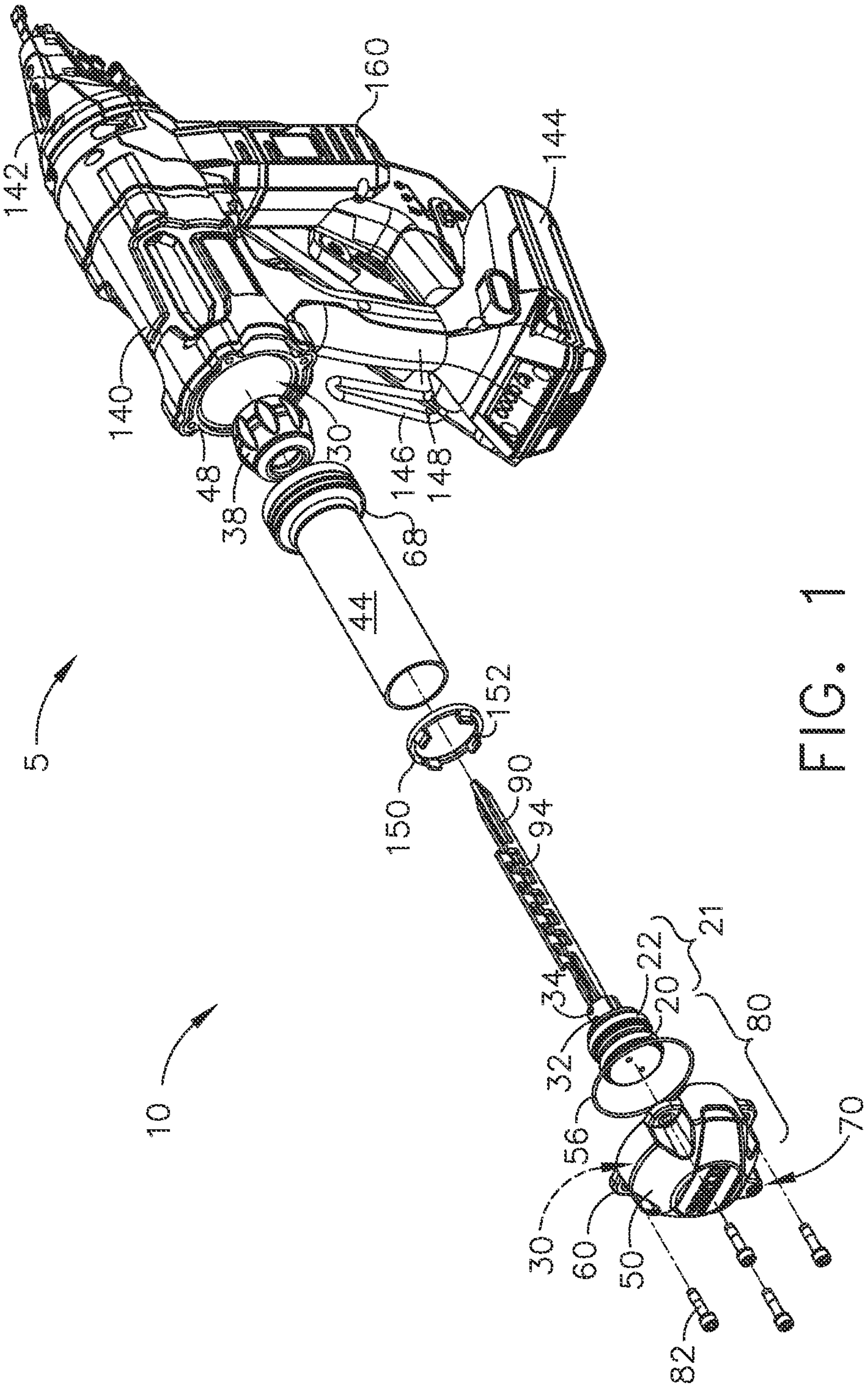
FIG. 1 is an exploded view of the pressure vessel subassembly and the end cap of a gas-spring fastener driving tool, in which the pressure vessel subassembly, the end cap, and the gas spring tool are constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a new embodiment of a FUSION-type tool is illustrated. A fastener driving tool is generally designated by the reference numeral 5, and it has a pressure vessel subassembly ("pressure vessel S/A") that includes a working cylinder subassembly that is generally designated by the reference numeral 10.

Portions of the pressure vessel S/A are illustrated as a working cylinder wall (or "main portion" or "sleeve") 44, a piston stop (or "bumper") 38, a spacer 150 with a plurality of tabs 152, a driver (or "hammer" or "blade") 90 having a plurality of driver teeth 94, and a two-part piston having a top portion 20 and a bottom portion 22. The bottom piston half 22 is attached to the driver 90 by use of a pair of pins 32 and 34 that are inserted through small channels, that also extend through openings in the driver. The driver itself goes through an opening of the piston stop 38, and further into a guide body 36 (see FIG. 7), which guides the driver in its movements for driving a fastener. Note the thickened cylinder sleeve wall 68 at one end of the sleeve 44. This thickened sleeve 68 encloses the bumper 38 when assembled inside the tool 5.

An end cap subassembly ("end cap S/A") is designated by the reference numeral 80. The end cap S/A 80 includes an end cap 50, a fill-valve subassembly ("fill-valve S/A") 70, a plurality of end cap fasteners 82, a flange 60 for receiving the end cap fasteners, and a seal (also referred to herein as an O-ring) 56 between the end cap and a pressure chamber 30.

The end cap subassembly 80 includes the end cap 50, which is fastened to the uppermost portion of the outer walls of the pressure chamber by the fasteners 82. It can be seen that there are several fasteners that hold the end cap 50 to the pressure chamber outer wall, at a pair of flanges 48 and 60. The flanges have extensions (or bosses) with openings in them for holding the fasteners, which in this embodiment are a set of screws or bolts 82. For example, the flange 60 has openings for receiving the screws 82 that hold the end cap 50 in place; similarly, the flange 48 has threads for holding the screws 82 that hold the end cap 50 to that flange 48.

The main storage chamber, generally designated by the reference numeral 30, is also referred to herein as the "pressure chamber" or quote "pressure vessel." In this embodiment, the pressure chamber 30 mainly comprises an annular space that partially surrounds the working cylinder wall 44, and the pressurized space at 30 is essentially between the outer surface of the working cylinder wall 44 and the inner surface of the pressure chamber outer wall 46

Figure 7:
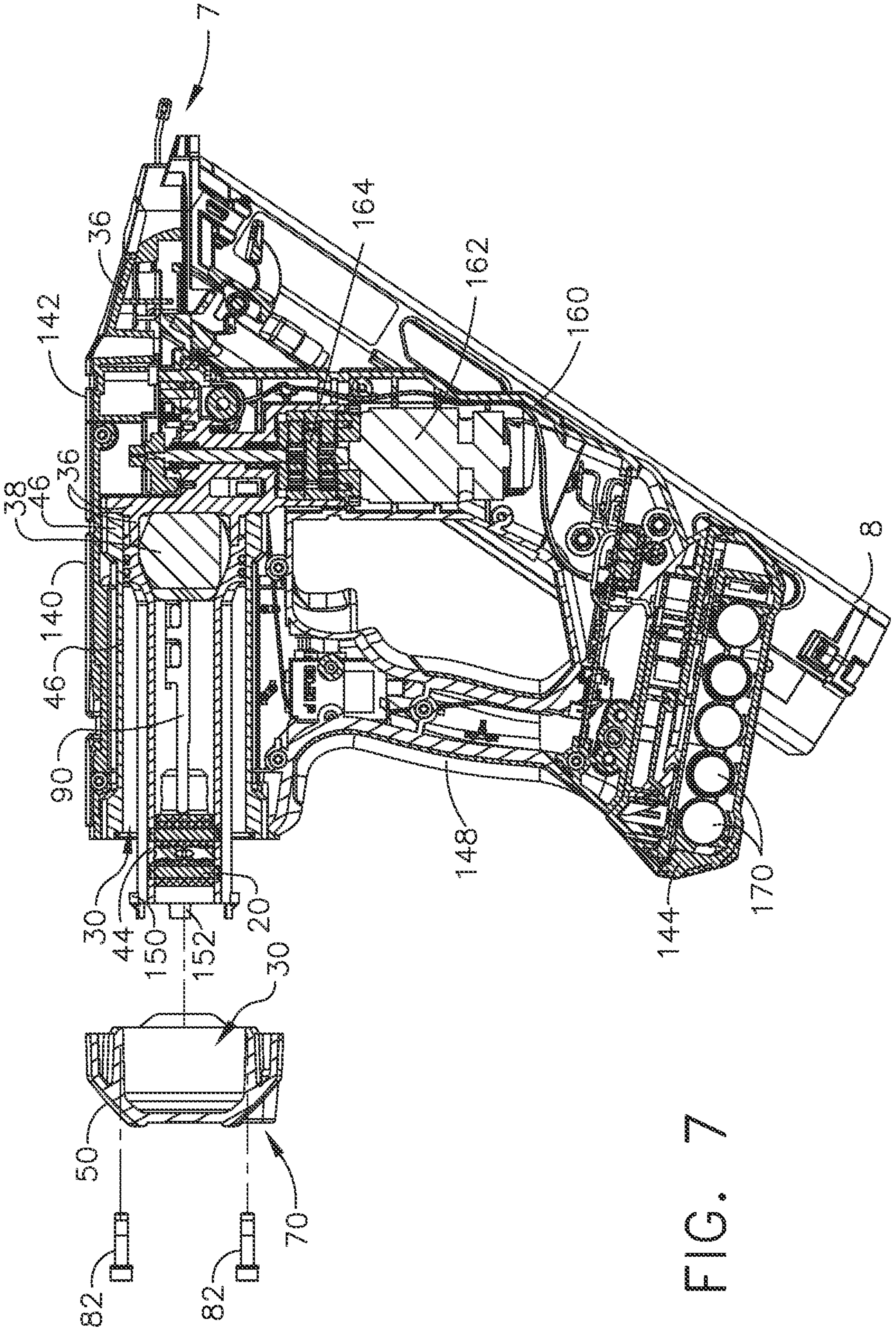
FIG. 7 is a cutaway view of the tool along the line 7-7 of FIG. 11, showing the end cap removed.

(see FIG. 7). The pressure vessel also includes the varying volume above the moveable piston of the working cylinder.

As noted above, the portion of the tool that is referred to by the reference numeral 10 is the entire working cylinder subassembly, which is under pressure once a pressurized gas is introduced into the system. With that in mind, there is an additional seal to help hold that pressure within the pressure chamber 30. On the end cap subassembly 80 of this first embodiment, there is a seal (an O-ring) at the reference numeral 56. It will be understood that the end cap 50 forms part of the overall pressure vessel.

The main purpose of the pressure chamber is to hold additional pressurized gas for use in driving the piston subassembly in its downward or "driving stroke" direction, in which it will be driving a fastener such as a nail or a staple. This additional pressurized gas in the pressure chamber allows for a sufficient force to be imparted against the upper surface of the top portion of the piston at 20, while forcing a nail or staple into a target surface, such as a piece of wood. This storage volume 30 that represents the pressure chamber allows a lower overall gas pressure to be used in the overall workings of this fastener driving tool to provide a gas spring effect without requiring an extremely high pressure that would otherwise be required in the displacement volume above the piston within the working cylinder, if there was no pressure chamber to hold additional pressurized gas.

The tool 5 exhibits other major structural elements, including a rear housing portion 140, a front housing portion 142, a motor housing 160, a handle 148, a hanger (or hook) 146, a battery pack 144, and a flange 48 for receiving the plurality of end cap fasteners.

The overall shape and structure of the end cap and its mating flange surfaces to the top of the pressure chamber are designed so that a human user can safely remove the end cap merely by loosening the screws 82, even though the working cylinder and the pressure chamber still contain a relatively high gas pressure therewithin. As a human user begins to remove the screws 82, the pressurized gas will safely begin to escape around the edges of the bottom surfaces of the end cap. That pressurized gas is essentially released at a controlled rate because of two main factors: in the first place there is the O-ring seal 56, and in the second place it will take some time to remove the screws to even begin to allow gas to start escaping around the perimeter of the outer flange surfaces 48 and 60. As the screws are loosened, the pressurized gas will begin to escape, and by the time the final screw is totally removed, the internal gas pressure will be at a safe magnitude, and the end cap can then safely be entirely removed from the top of the pressure chamber 30, thereby exposing the interior of the working cylinder so that the piston and other internal components can be replaced, as desired.

Figure 2:
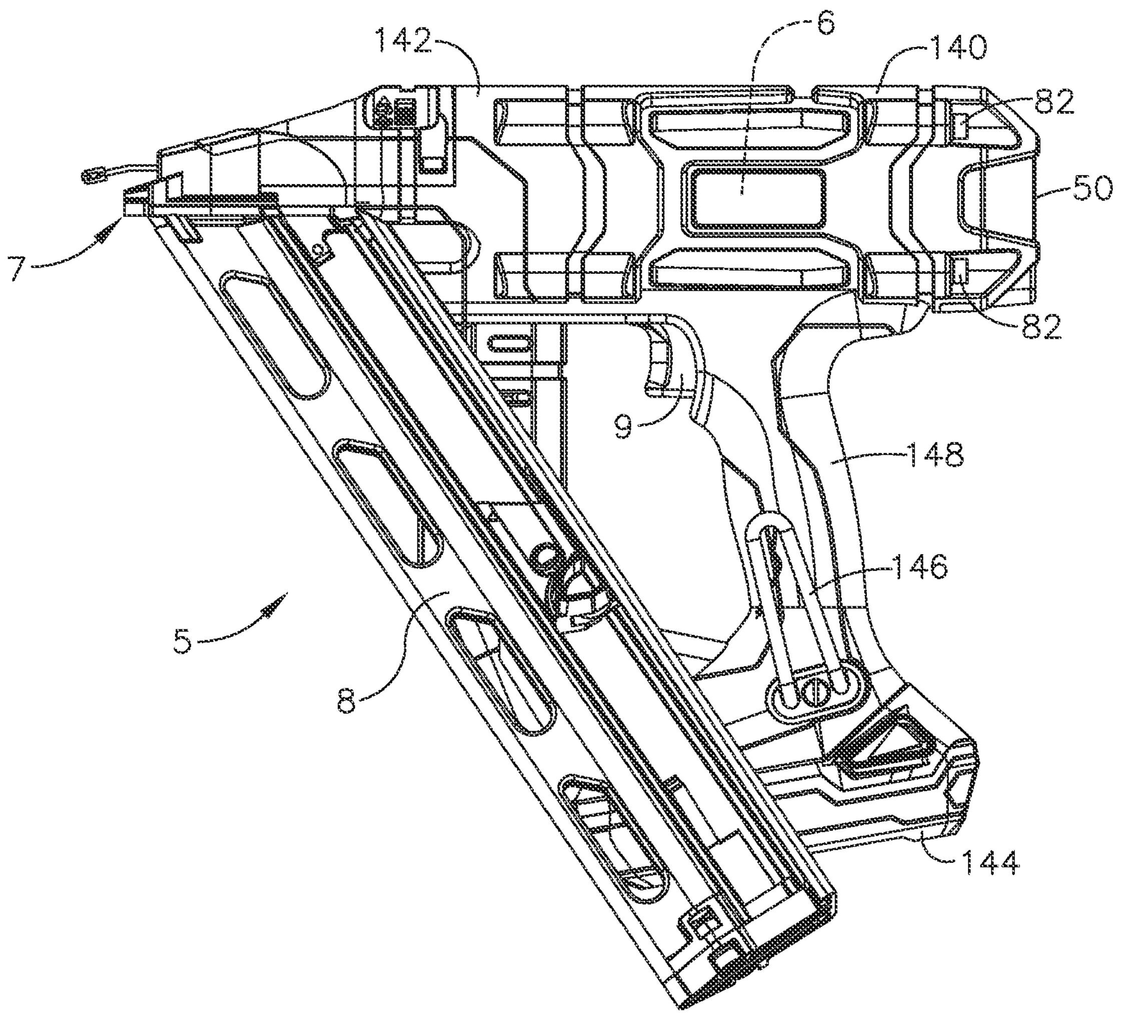
FIG. 2 is a side-elevational view of the tool of FIG. 1.

Referring now to FIG. 2, the tool 5 includes a pressurized chamber portion 6, an exit end (where the nails are shot) 7, a fastener magazine portion 8, and a hand-operated trigger 9. FIG. 2 illustrates the fully assembled end cap S/A 80 mounted securely to the tool 5.

Figure 3:
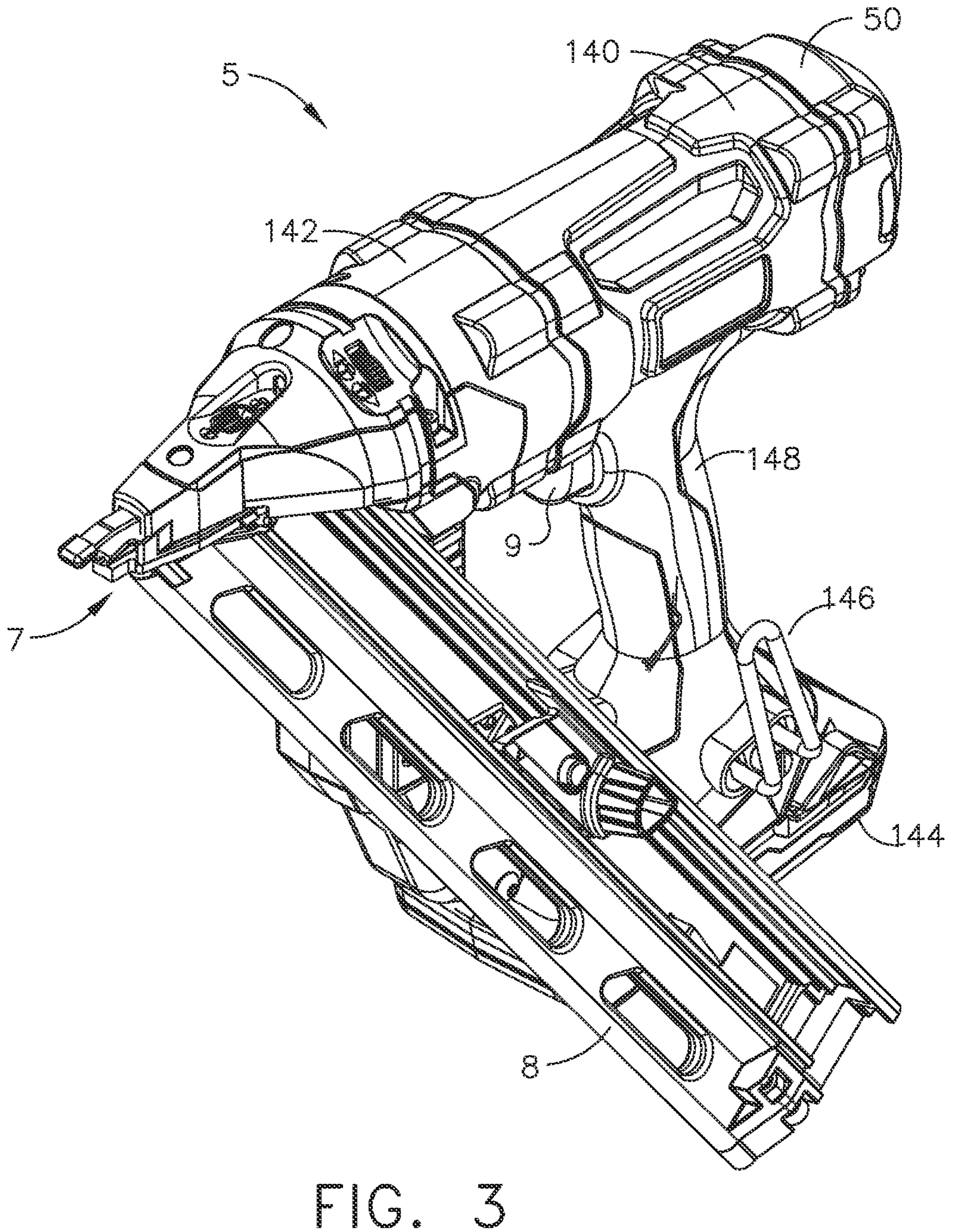
FIG. 3 is a front-left perspective view of the tool of FIG. 1.
Figure 4:
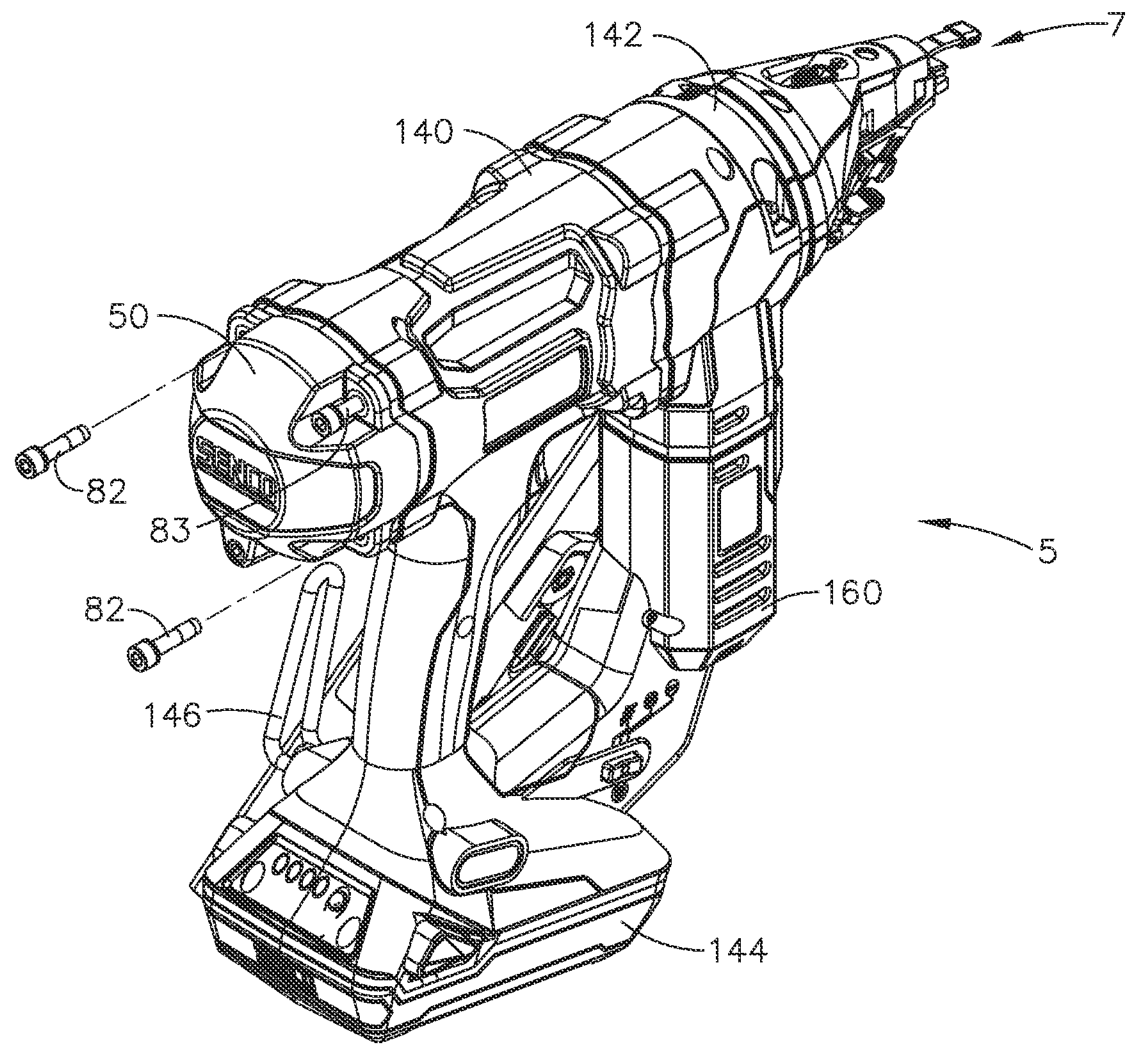
FIG. 4 is a rear-right perspective view of the tool of FIG. 1, showing two end cap fasteners removed.
Figure 5:
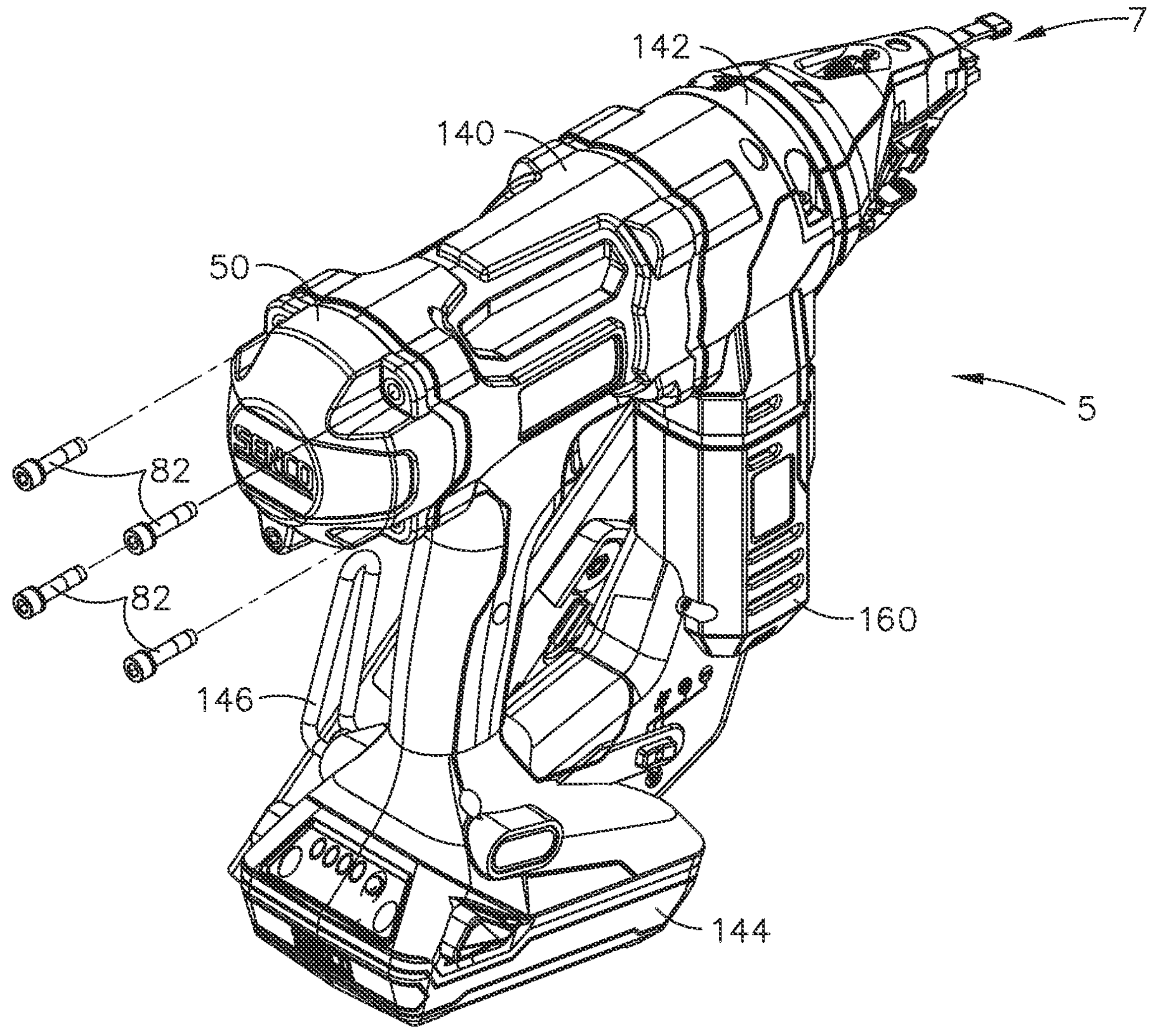
FIG. 5 is a rear-right perspective view of the tool of FIG. 1, showing all of the end cap fasteners removed.
Figure 6:
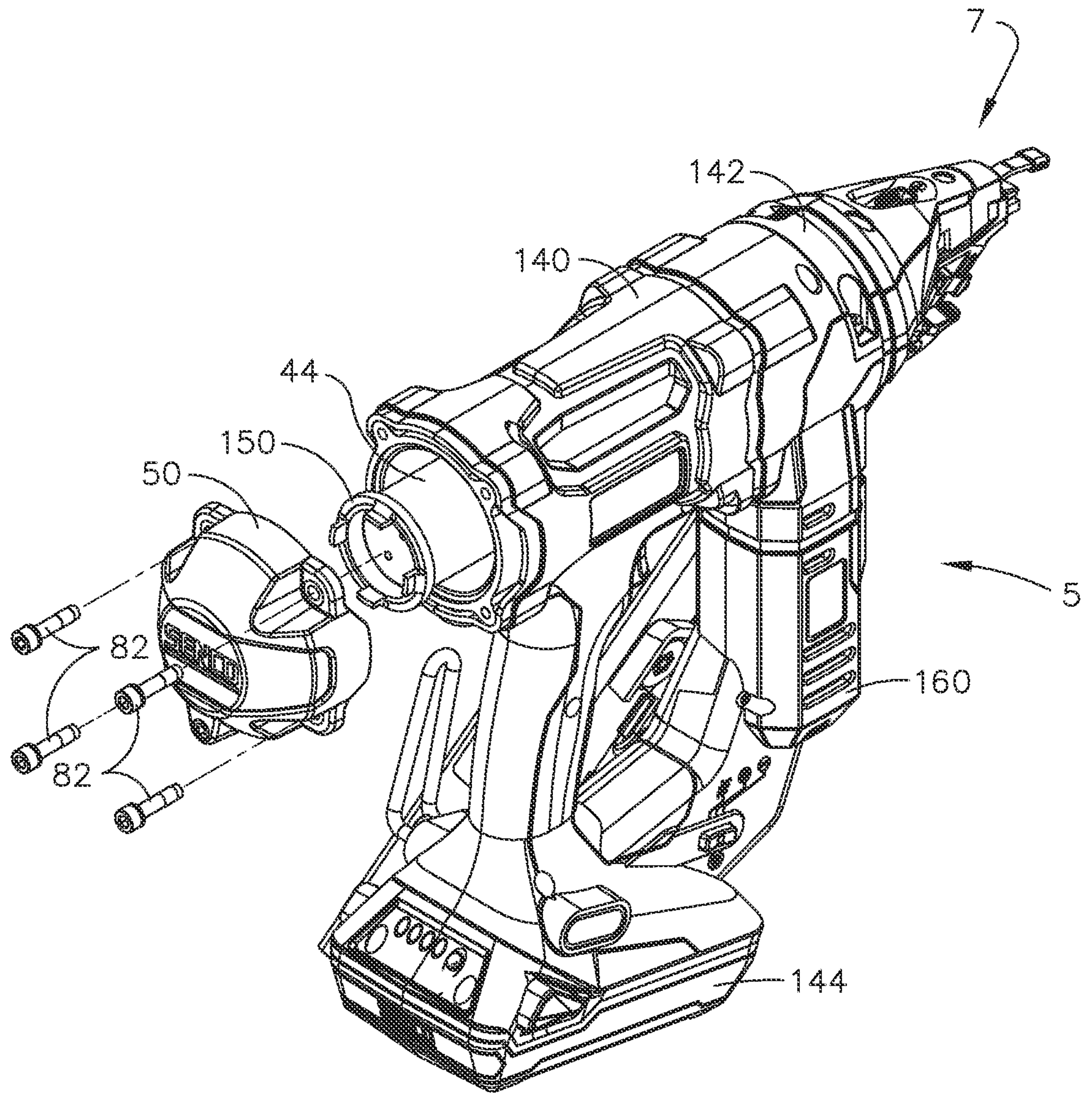
FIG. 6 is a rear-right perspective view of the tool of FIG. 1, showing the end cap removed.

Referring now to FIG. 3, the tool 5 is shown in a front perspective view fully assembled. FIGS. 4-6 illustrate how the end cap S/A 80 is safely disassembled from the tool 5 by the end user.

Referring now to FIG. 4, a first action in removing the end cap S/A 80 is shown. The user begins the disassembly process by removing one fastener 82 at a time. In FIG. 4, two fasteners 82 are shown removed. At this point, the pressurized gas is already leaking out in a safe, controlled manner. Note that a fastener 83 is illustrated in FIG. 4. In this illustration, fastener 83 is the "third screw" to be removed, and when fully removed, enough pressurized gas will have escaped that it is safe to continue removing the fourth and final fastener 82. Note that fastener 83 could be any of the four fasteners 82; it merely depends on the user's preference as to which fasteners to remove in succession.

Referring now to FIG. 5, all four fasteners 82 have been removed. The pressurized gas has safely escaped, and the end cap 50 has not "blown off" in the face of the user, and is now safe to remove.

In FIG. 6, the end cap 50 is shown fully removed and access to the interior of the tool 5 is available. FIG. 7 is a side cutaway view of the tool 5. The pressure chamber outer wall 46 is clearly shown proximal to the sleeve 44. There is an open space 30 between the outer wall 46 and the sleeve 44, which is where the pressurized gas is stored when the tool 5 is fully assembled. The guide body 36 is shown proximal to the bumper 38.

A plurality of battery cells 170 are shown inside the battery pack 144. The motor housing 160 encloses a motor 162 and a gearbox 164. The battery pack 144 energizes the motor 162 when the trigger 9 is pulled by the user. When the motor 162 engages, the piston 21 (which is the entire piston subassembly 20,22) and driver 90 are released from the lifter (not shown) and drive a fastener into a substrate. Then the motor 162 energizes the gearbox 164 to lift the piston 21 and driver 90 back to a "ready position" (as approximately depicted in FIG. 7).

Figure 8:
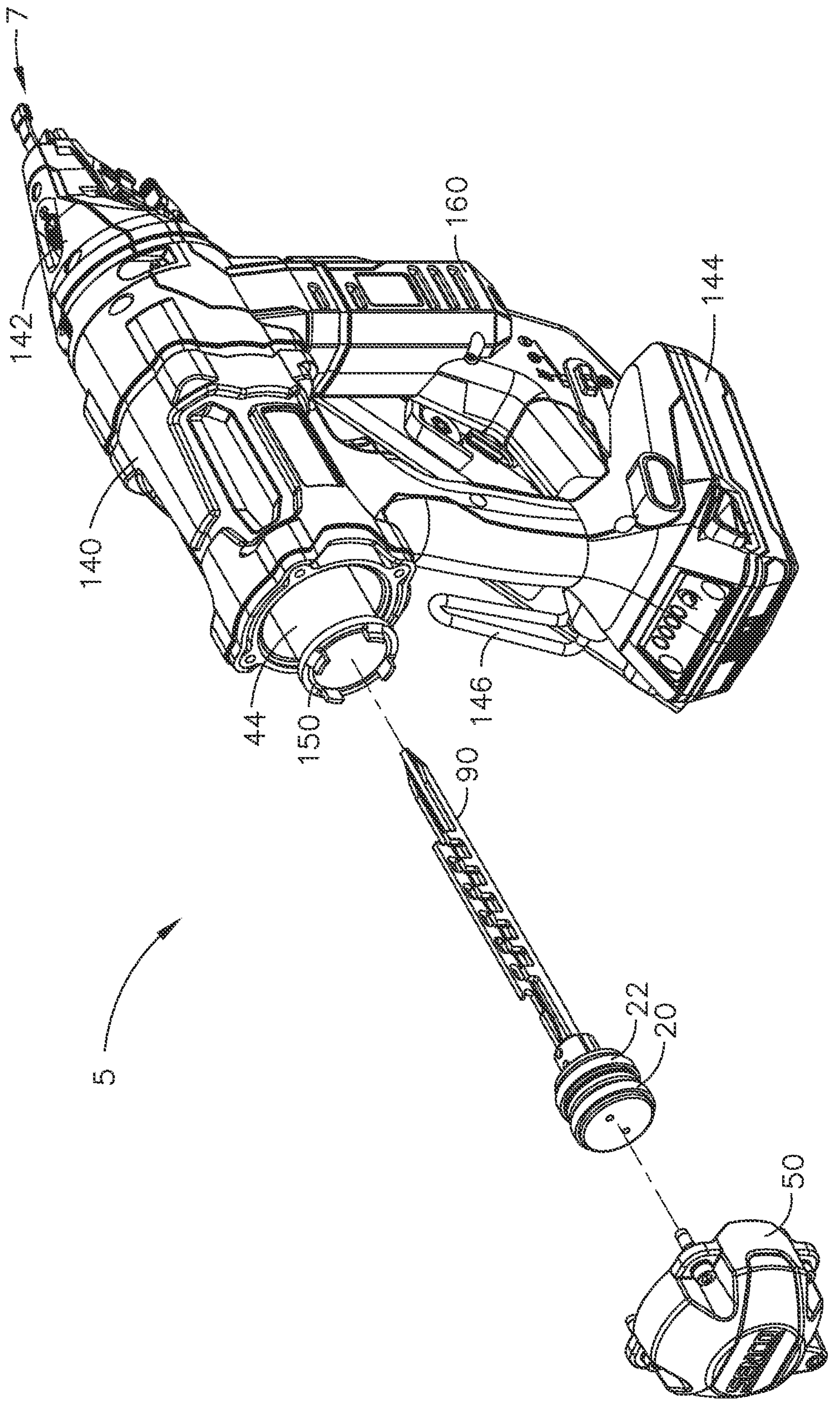
FIG. 8 is a rear-right perspective view of the tool of FIG. 1, showing the piston and driver removed.
Figure 9:
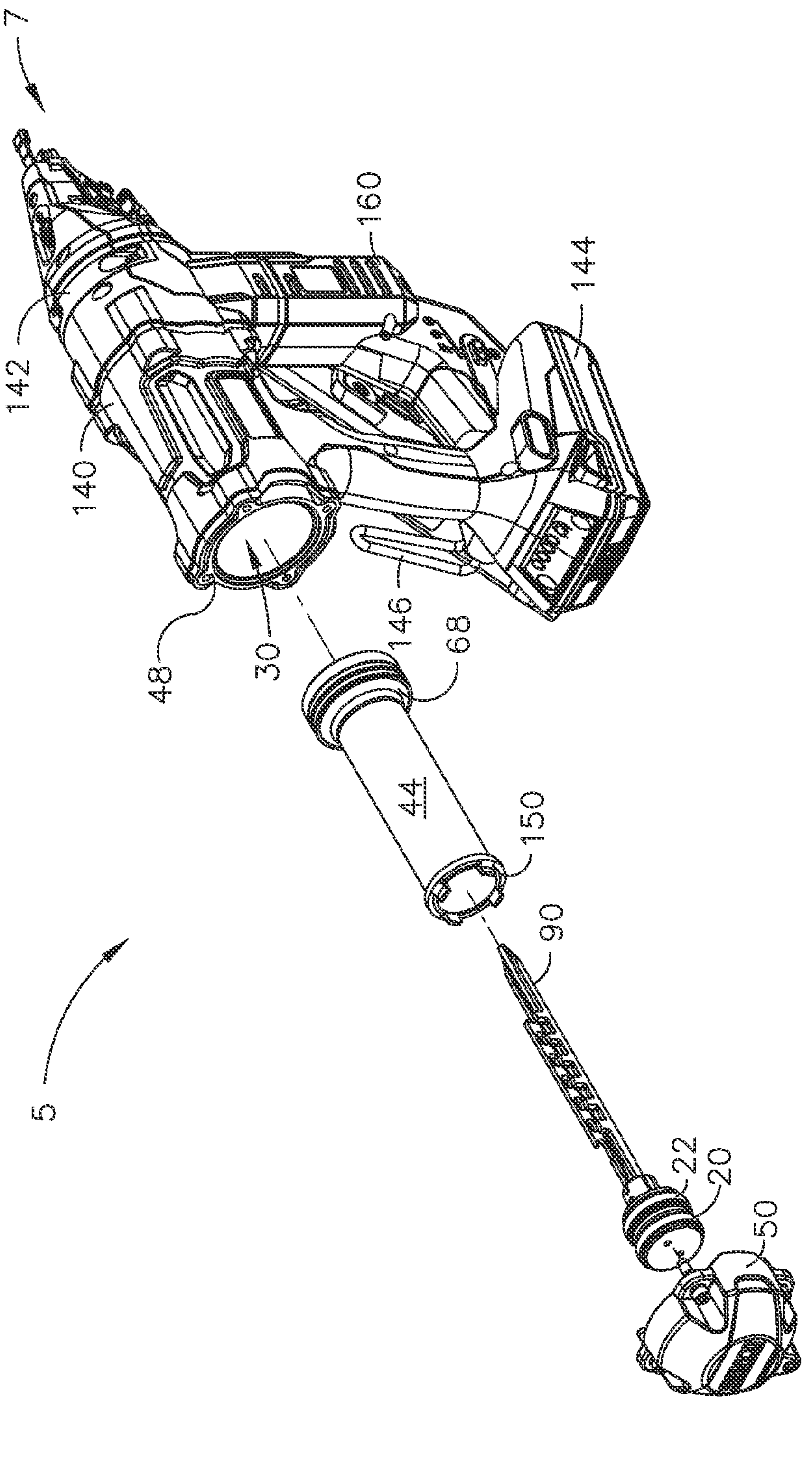
FIG. 9 is a rear-right perspective view of the tool of FIG. 1, showing the cylinder sleeve, piston, and driver removed.
Figure 10:
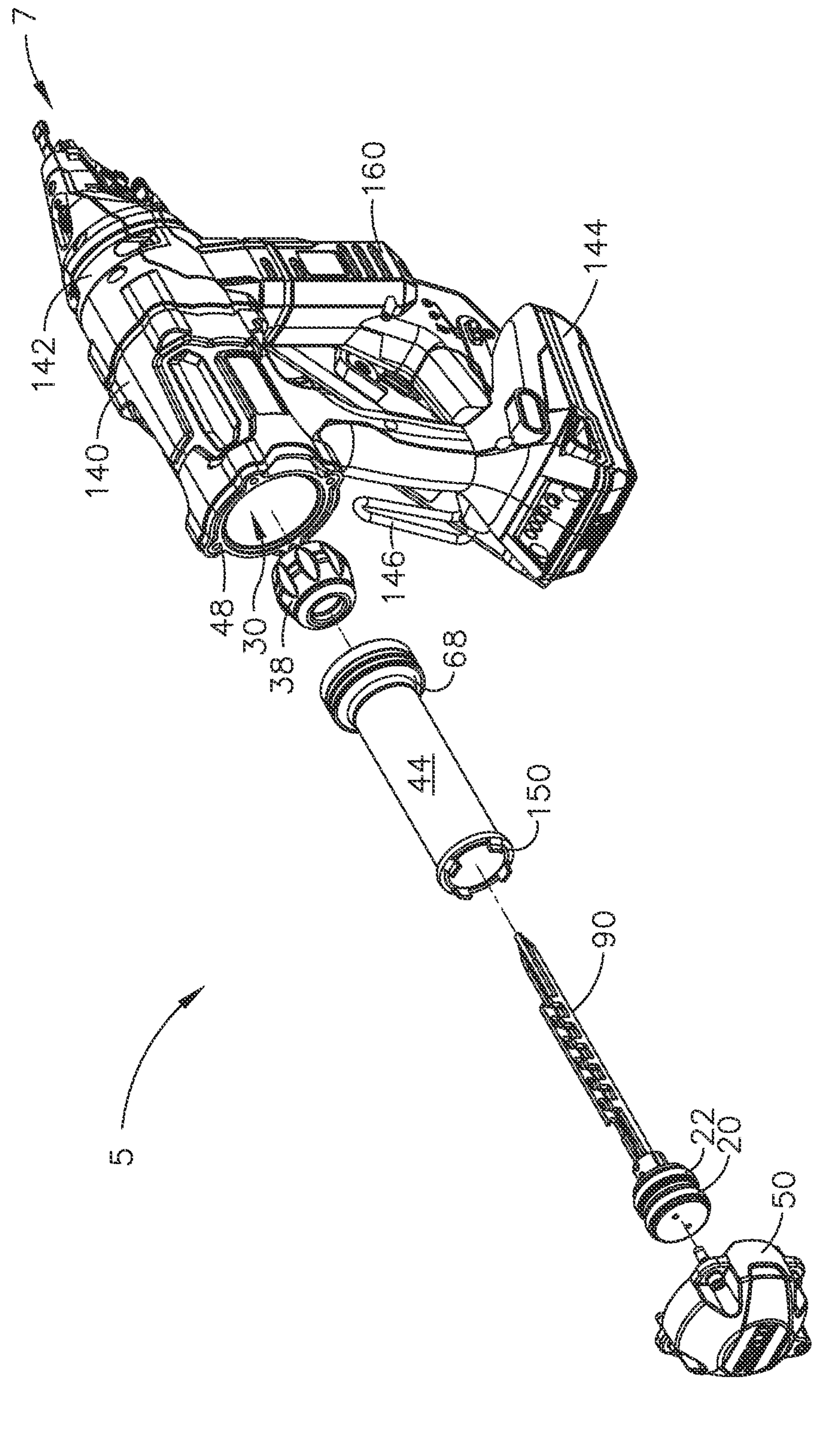
FIG. 10 is a rear-right perspective view of the tool of FIG. 1, showing the piston's bumper, cylinder sleeve, piston, and driver removed.

FIGS. 8-10 illustrate further disassembly of the tool 5 after removal of the end cap S/A as illustrated in FIGS. 4-6. FIG. 8 shows the piston 21 and driver 90 removed from the tool 5, in the next action of disassembly/maintenance the user performs. No tools are necessary at this point after the fasteners 82 have been removed.

FIG. 9 shows the sleeve 44 removed from the tool 5, in a further stage of disassembly/maintenance. FIG. 10 shows the bumper 38 removed from the tool 5, in a final stage of disassembly/maintenance. At this stage, the entire pressure chamber outer wall 46 is visible and its internal parts can be serviced, as well as any portion of the tool 5 that has already been removed.

Figure 11:
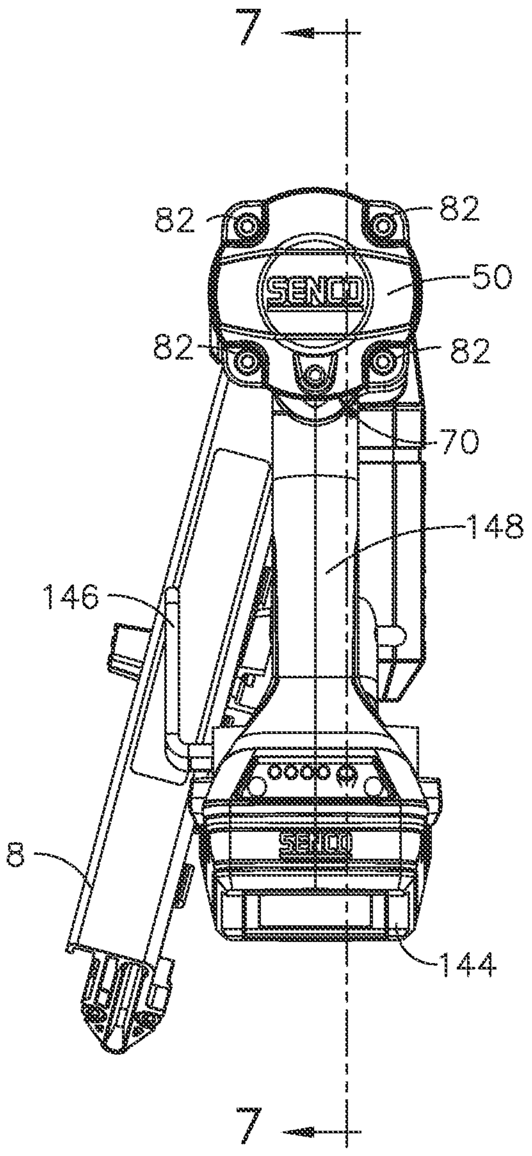
FIG. 11 is a rear elevational view of the tool of FIG. 1.

Referring now to FIG. 11, a rear elevational view illustrates the end cap 50, the fasteners 82, and the fill valve 70. In this embodiment, the fill valve 70 is assembled in line to the handle 148 (as seen in this view).

In the following description, it will initially be assumed that the fill valve S/A 70 is not going to be actuated by the user, to perform the maintenance procedure that is about to be described. Instead, the user will begin to disassemble the fastener driving tool (i.e., the nailer 5) by removing the end cap 50. Even though the nailer 5 contains pressurized gas in its main storage chamber 30, that gas can be safely released during the following maintenance procedure for removing the end cap.

The end cap 50 is held in place to the flange 48 at the top (or back) end of the pressure vessel by four screws 82. These four screws are to be removed by the user, one screw at a time. After the first two screws 82 are removed from the flange 48, perhaps most of the internal gas pressure will still be retained within the main storage chamber 30. However, while the third screw 83 is being removed (see FIG. 4), a major remaining portion of the gas pressure will begin to be released while the end cap 50 is still being held in place to the flange 48 by the fourth, remaining screw 82 (not visible in that view). Therefore, by the time the fourth screw begins to be removed, the majority of the pressurized gas that was being held in the storage chamber 30 has already been released, and that fourth screw 82 can be removed safely, and there will be no danger of the end cap 50 being 'blown off' the back (top) end of the tool 5 during that procedure. (See FIG. 5 for that procedural action.)

The flange 48 is an integral portion of the pressure vessel (e.g., at the left-hand portion of the pressure chamber outer wall 46, as viewed in FIG. 7). In other words, the flange 48 comprises a 'rear' portion of the pressure vessel, which is primarily made up of the storage chamber outer wall 46. When the end cap 50 is attached to the flange 48, with all the fasteners 82 fully tightened, that creates a pressure seal—along with the O-ring 56—at the rear (or 'top') portion of the tool 5, and this encloses the main storage chamber 30 at the rear of the tool.

The large O-ring 56 acts as a seal at times when the entire tool 5 is assembled (i.e., at times when the end cap 50 is assembled to the flange 48). As the first, second, and third screws 82 are being removed from that flange 48, the internal gas pressure will safely begin to leak out around the O-ring 56, by design. And by the time the third screw 82 is being loosened, the gas leak becomes progressively more noticeable, and more pronounced to the point where the internal gas pressure essentially becomes equalized to atmospheric pressure by the time the third screw is completely removed. It will be understood that this third screw 82 becomes the screw having the reference numeral 83 on FIG. 4; and further, that any one of the four screws 82 can become that "third screw" with regard to the exact positioning of the four screws in a sequence that are to be removed by this procedure.

It will be understood that, as an option, the fill valve S/A 70 could instead have been actuated to vent (or exhaust) the pressurized gas from the main storage chamber 30, if desired. Once the pressurized gas has been removed through the fill valve, which preferably is a Schrader valve, then the end cap 50 may be removed using the same procedure as described above, without much further escaping pressurized gas being involved. (There should only be a small residual pressure remaining in the pressure vessel by that point in the maintenance procedure.) In either event, the goal is to remove the end cap 50 from the flange 48, and then to move on to further actions in the maintenance procedure, as follows.

Now that the end cap 50 has been removed from the back end of the tool 5, desirable maintenance procedures can be quickly and easily performed. The sleeve 44 of the working cylinder will be partially protruding from the back opening of the rear housing portion 140, as seen in FIG. 6. A spacer 150 rests on the rear end of the sleeve 44, and can be manually removed from that sleeve without the need for any tool. This "rear end" of the sleeve can be referred to as the proximal end of the sleeve 44, particularly since it is proximal to the end cap 50. The opposite end of the sleeve can be referred to as the distal end, which is proximal to the piston stop 38.

At this point in the maintenance procedure, the user has two main choices as to the next action. In Choice #1, the user can pull on the sleeve 44, and remove the sleeve itself; or in Choice #2, the user can remove the piston/driver combination from within the sleeve 44.

If the user desires to replace the entire working cylinder, then the user will likely decide to pull out the sleeve 44—i.e., he/she will perform Choice #1. In a tool that is in a 'normal' state, the piston 21 and the driver 90 would likely come out from the tool along with the sleeve 44. However, if the tool 5 has become "jammed," then the driver 90 might not be movable at this point in the maintenance procedure. In that possible event, the sleeve 44 will need to be removed by itself, while the piston/driver combination remains 'stuck' inside the tool 5. Since the gas pressure has already been dissipated, the user can safely attend to 'fixing' the jammed condition, which typically is due to a fastener that did not feed correctly from the magazine 8 into the driver track, during a driving stroke. After the jam has been cleared, the user will be able to pull out the driver 90 and piston 21 combination, as seen in FIG. 8. (Note: FIG. 8 shows the sleeve 44 still in place within the rear opening of housing portion 140, but the sleeve would have already been removed if the user decided to perform this Choice #1 procedure, as described above.)

If the user desires only to either (#a) replace the piston/driver combination, or (#b) unjam the tool (without replacing anything), then the user may decide to perform the above Choice #2. In that situation, the user must push the front end of the driver 90 (at the exit end 7 of the tool) back into the tool far enough that the top of the piston half 20 slightly protrudes from the top of the sleeve 44. (This precise state is not illustrated. And note: a tool is typically used to push the driver inward, into the tool 5.) Then, the user can manually grab hold of the top piston half 20, and pull out the combination piston 21 and driver 90, as illustrated in FIG. 8. It should be noted that the bottom piston half 22 is connected to the top of the driver 90 by use of two connecting pins 32 and 34, which are illustrated in FIG. 1.

Whether Choice #1 or Choice #2 is selected by the user who is performing a maintenance procedure on tool 5, it can be seen from the drawings and from the above description that the piston 21, and the driver 90, and the sleeve 44 of the working cylinder are easily accessible once the end cap 50 has been removed. FIG. 9 depicts both the piston/driver and the cylinder sleeve having been removed from the interior of the rear housing portion 140, leaving behind the remaining portions of the pressure vessel, which mainly comprises the pressure chamber outer wall 46 (see FIG. 7) which is the main structural component of the (normally pressurized) main storage chamber 30. The piston stop (or "bumper") 38 (see FIG. 7) is also still in position at this stage of the maintenance procedure, as described so far.

The piston stop 38 is a typical 'wear item' in gas spring fastener driving tools, such as the tool 5. To replace the piston stop, the sleeve 44 and the piston/driver combination (21 and 90) must first be removed by one of the procedures described above, which would place the tool 5 in a state as illustrated in FIG. 9. After that state has been achieved, the piston stop 38 can be easily pulled out from the tool 5 without the use of any tools.

If desired, all of the removed parts can be replaced by brand new parts, which is a typical goal of the overall maintenance procedure being described herein. However, if the tool suffered a jam while the tool was comparative new, then perhaps the goal of the maintenance procedure is only to remove the necessary parts so as to obtain access to the cause of the jammed condition, and none of the parts might be replaced. In any event, whether the 'old' parts are re-inserted into the tool 5, or 'new' parts are to be installed, the installation maintenance procedure is relatively straightforward.

When the user is ready to reassemble the tool 5, he/she will first install the piston stop 38, which merely sits on an interior pressure wall surface of the guide body 36. As seen in FIG. 7, the guide body has an upward circular-shaped protrusion that fits around the piston stop, and will hold the piston stop in place, once the piston stop is installed. Since the piston stop 38 fits within an enlarged diameter portion 68 of the sleeve 44 (at the bottom of the sleeve—see FIG. 10), it is optionally possible for the user to first install the piston stop into that enlarged portion 68 of the sleeve, and then install the combination of the sleeve and contained piston stop into the interior of the main storage chamber 30. (Note, however, that because of gravity, this optional action may need to be performed with the tool temporarily positioned upside down.) The spacer 150 is then placed on the back (or top) circular edge of the sleeve 44—in the position as illustrated in FIG. 10. The spacer 150 has a bottom circular surface that has a stepped shape so that it will be centered on the top circular surface of the cylindrical sleeve, and will remain at rest in position until the end cap 50 is reattached to the tool.

The combination driver 90 and piston 21 is now installed, in which the driver 90 must be run through the opening in the piston stop 38. (And note, the driver/piston combination can optionally be installed before the sleeve 44 is installed, if desired.) Once all of the above components have been installed, the end cap 50 is mounted to the flange 48, and the four screws 82 are then inserted in the four end cap openings, and then tightened. The tabs 152 of the spacer 150 hold the sleeve 44 in the proper orientation with respect to the interior wall of the end cap 50.

Finally, a pressurized source of gas is placed on the fill valve to re-pressurize the pressure chamber of the tool. In this illustrated embodiment, the pressure chamber includes the main storage chamber 30 that surrounds the sleeve 44, and also the portion of the interior of the end cap (at 30—see FIG. 7) that is 'above' the top of the piston 21. In a FUSION® fastener driving tool sold by Kyocera Senco Industrial Tools, Inc. of Cincinnati, Ohio (which is the type of tool being illustrated in these figures), the pressurized gas above the piston is always in fluidic communication with the gas that is surrounding the sleeve 44. It will be understood that the volume of the space that is 'above' the top of the piston 21 varies as the piston moves through its reciprocating stroke; and that variable volume space above the piston is always under pressure in a Senco FUSION tool, such as that illustrated herein.

Most of the metal parts of the tool 5 can be made of aluminum, including the end cap 50, the piston bottom 22, the sleeve 44, and the cylindrical pressure chamber 46. Any suitable material could be used, but preferably a metal is specified for most of those parts. The top portion 20 of the piston can be made of a plastic material, preferably Delrin. The outer housing portions 140 and 142 are typically made of a tough plastic material, and attached in a clamshell style structure.

The drawings provided herein include some other relatively new features for a FUSION-type tool that will be sold by Kyocera Senco, which are described in other patent documents noted below.

It can be seen from the drawings and the above description that the tool 5 can be safely disassembled without removing any portions of the rear housing portion 140 or the front housing portion 142, and thereby allowing maintenance procedures to take place needing only a small tool, such as a screwdriver or wrench, that is used to unscrew, and re-screw the four screws 82 that hold the end cap 50 to the flange 48. This is a vast improvement over the prior art tools that required at least one of the housing halves to be removed before attempting any such maintenance procedures.

As a further option, the pressurized gas that is contained within the pressure vessel (i.e., the main storage chamber 30, bounded by the outer wall 46) may be vented (or exhausted) through the fill valve 70, rather than by first removing the end cap 50. Of course, the end cap must still be removed in any event so as to perform one of the maintenance procedures that is described hereinabove. But even at that, the fill valve 70 is accessible without removing any portion of the housing, thereby simplifying the overall maintenance procedure.

The overall structure of the pressure chamber is designed so that both the removal, and the installation, of the 'maintenance parts' is simplified and straightforward. When the tool 5 is completely assembled, the 'top' portion of the pressure vessel 46 (toward the left as viewed in FIG. 7) abuts the inner surface of the end cap 50, and the 'bottom' portion of the pressure vessel 46 (toward the right as viewed in FIG. 7) abuts a flat surface of the guide body 36. In other words, major components of the pressure vessel are held in place between the end cap and the guide body by a stack-up of the following components: the end cap 50, the spacer 150, the sleeve 44, and a bottom structure that is provided by the guide body 36. This stack-up of parts is held in place without the use of any internal fasteners—see below for further details.

When the tool 5 is completely assembled, the 'bottom' portion of the working cylinder sleeve 44 abuts a circular upraised portion of the guide body 36. That upraised portion of the guide body is also used to surround (and keep in place) the piston stop 38. The 'top' portion of the sleeve 44 is placed into physical contact with the spacer 150 during assembly. Spacer 150 is primarily circular, like a specially-shaped large lock washer. The 'special shape' of the spacer 150 involves a plurality of protruding tabs 152. These tabs 152 are sized and shaped to come into physical contact with the inner wall of the end cap 50, during assembly of the sleeve and the other components that are to be placed within the working cylinder (e.g., the piston 21 and driver 90). When the end cap 50 is tightened down against the flange 48 (via the screws 82), the spacer's tabs 152 provide a force that is directed downward (toward the right in FIG. 7) and which holds the sleeve 44 against the uppermost circular rim of the guide body 36, right at the piston stop 38.

It should be noted that the plurality of tabs 152 are spaced-apart along the upper surface (to the left in FIG. 7) of the spacer 150. The 'gaps' (not numbered) between the individual tabs 152 allow the pressurized gas to flow in and out of the upper portion of the working cylinder ('above' the piston), from and to (respectively) the main storage chamber 30. This arrangement allows for a constant fluidic communication between the main storage chamber 30 and the upper portion of the working cylinder, as in earlier FUSION tools.

The entire assembly procedure of the interior components of the pressure chamber, as described in the two previous paragraphs, is thereby designed to be performed without any tools, except for a screwdriver or wrench to tighten the screws 82. All of those interior components are sized and shaped to fit together without additional fasteners, and thus, disassembly is also simplified and performed without any tools. And as noted above, the entire set of interior components is easily accessible without removing any portion of the outer housing (i.e., the rear housing portion 140 or the front housing portion 142). None of the conventional gas-spring tools have a structure that provides for these simplified assembly and disassembly features. This 'stack-up' feature of these major components, including the sleeve 44, spacer 150, piston 21, driver 90, and piston stop 38, may be unique among all types of 'air tools,' not only FUSION-type gas-spring tools that re-use the pressurized gas in multiple driving strokes. (Most 'air tools' include multiple valves that prevent easy disassembly—i.e., disassembly without tools—of the interior components.)

It will be understood that the bottom structure of the pressure vessel (i.e., the portions of the tool that contain the pressurized gas, such as the storage chamber outer wall 46 and the working cylinder's sleeve 44) can optionally be designed as a separate part that is attached to, or formed as a part of, other components of the tool 5. In the illustrated embodiment, the bottom structure of the pressure vessel is formed as part of the guide body 36, which is an exemplary way of designing such a fastener driving tool. In essence, the entire pressure vessel of the illustrated embodiment includes the guide body 36, the sleeve 44, the reciprocating piston 21 and its associated seals, the storage chamber outer wall 46, the end cap 50, and the fill valve subassembly 70, including the smaller gas passageways that lead to the fill valve. Many of those major components are easily replaceable by the maintenance procedures described herein, including 'wear parts' such as the piston stop 38, the piston 21, the sleeve 44, and the driver 90. The end cap 50 and the spacer 150 are also easily replaceable, although they normally are not considered to be 'wear parts' in such tools.

It will be understood that disassembling the tool 5 is also useful for an inspection to ensure the tool is functioning properly. For example, this inspection is especially useful after a fastener jam incident. Removing the piston 21 and the driver 90 to either inspect a jam condition or repair a jam condition is easily accomplished by simply removing the end cap 50 as described above. If the piston 21 and the driver 90 appear to have no physical damage, the user can simply re-install them into the sleeve 44 and refasten the end cap 50 to the tool 5. Otherwise, if there is some physical damage detected on the piston 21 and/or on the driver 90, the user can replace them, install the new components, and then refasten the end cap 50 to the tool 5.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A method for servicing a fastener driving tool, said method comprising:

(a) providing an assembled fastener driving tool that includes:

an outer housing;

a working cylinder that includes a cylindrical sleeve and a movable piston therewithin;

a storage chamber containing pressurized gas that is in fluidic communication with said working cylinder, said storage chamber having an outer wall;

a movable driver that is in mechanical communication with said piston at least during a driving stroke; and an end cap that is attachable/detachable to/from said storage chamber proximal to a high pressure portion of the working cylinder of said fastener driving tool, said end cap being removably secured to said storage chamber by a plurality of fasteners;

(b) carefully removing said end cap by loosening said plurality of fasteners in sequence, and evacuating said storage chamber to a safe pressure magnitude before the final one of said plurality of fasteners is removed; and (c) through an opening that is created by the removal of said end cap, without removing said outer housing, and without the use of any tool, directly accessing and removing at least one of:

(i) said movable piston;

(ii) said movable driver; and (iii) said sleeve of the working cylinder.

2. The method of claim 1, further comprising:

(a) providing a piston stop at a distal end of said working cylinder, wherein a proximal end of the working cylinder is proximal to said end cap; and (b) through said opening that is created by the removal of said end cap, without removing said outer housing, and without the use of any tool, directly accessing and removing said piston stop.

3. The method of claim 1, further comprising:

(a) providing a spacer that exhibits a plurality of spaced-apart protrusions, said spacer being mounted at a proximal end of said sleeve when said fastener driving tool is properly assembled, wherein a proximal end of the sleeve is proximal to said end cap, and said spacer and protrusions being sized and shaped so as to hold said sleeve in a correct orientation with respect to said end cap after said fastener driving tool has been properly assembled; and (b) through said opening that is created by the removal of said end cap, without removing said outer housing, and without the use of any tool, directly accessing and removing said spacer.

4. The method of claim 3, further comprising:

(a) replacing at least one of said movable piston, said movable driver, said sleeve of the working cylinder, and said spacer;

(b) installing new, or the original parts, for said movable piston, said movable driver, said sleeve of the working cylinder, and said spacer, by the following procedure:

(i) inserting said movable driver and said movable piston through said opening;

(ii) inserting said sleeve through said opening, wherein said sleeve is placed over said movable piston;

(iii) mounting said spacer onto a proximal end of said sleeve;

(iv) attaching said end cap to said storage chamber, using said plurality of fasteners, and during this attaching action, forcing said spacer to be positioned in a correct orientation with respect to said end cap and with respect to said sleeve after said fastener driving tool has been properly assembled; and (c) wherein, all of the above actions for installation are performed without the use of any tool, except for the action of attaching said end cap using said plurality of fasteners.

5. The method of claim 3, further comprising:

(a) replacing at least one of the original parts with a new appropriate part, including at least one of said movable piston, said movable driver, said sleeve of the working cylinder, said piston stop, and said spacer;

(b) installing new, or the original, parts for said movable piston, said movable driver, said sleeve of the working cylinder, said piston stop, and said spacer, by the following procedure:

(i) inserting said piston stop through said opening;

(ii) inserting said movable driver and said movable piston through said opening;

(iii) inserting said sleeve through said opening, wherein said sleeve at least partially surrounds said movable piston and said piston stop;

(iv) mounting said spacer onto a proximal end of said sleeve;

(v) attaching said end cap to said storage chamber, using said plurality of fasteners, and during this attaching action, forcing said spacer to be positioned in a correct orientation with respect to said end cap and with respect to said sleeve after said fastener driving tool has been properly assembled; and (c) wherein, all of the above actions for installation are performed without the use of any tool, except for the action of attaching said end cap using said plurality of fasteners.

6. The method of claim 3, further comprising:

(a) removing said movable piston and said movable driver through said opening;

(b) inspecting said movable piston and said movable driver;

(c) installing said movable driver and said movable piston through said opening;

(d) attaching said end cap to said storage chamber, using said plurality of fasteners, and during this attaching action, forcing said spacer to be positioned in a correct orientation with respect to said end cap and with respect to said sleeve after said fastener driving tool has been properly assembled; and (e) wherein, all of the above actions for installation are performed without the use of any tool, except for the action of attaching said end cap using said plurality of fasteners.

7. A method for servicing a fastener driving tool, said method comprising:

(a) providing an assembled fastener driving tool that includes:

an outer housing;

a working cylinder that includes a cylindrical sleeve and a movable piston therewithin;

a storage chamber containing pressurized gas that is in fluidic communication with said working cylinder;

a movable driver that is in mechanical communication with said piston at least during a driving stroke;

an end cap that is attachable/detachable to/from said storage chamber proximal to a high pressure portion of the working cylinder of said fastener driving tool, said end cap being removably secured to said storage chamber by a plurality of fasteners; and a fill valve that is located in said end cap, said fill valve being accessible without removing any portion of said outer housing, said fill valve being in fluidic communication with said storage chamber, said fill valve being actuatable to release the pressurized gas from said storage chamber to the environment outside said fastener driving tool;

(b) accessing and actuating said fill valve to vent the pressurized gas from said storage chamber to a safe pressure magnitude;

(c) removing said end cap by loosening said plurality of fasteners in sequence, and evacuating any residual pressurized gas from said storage chamber to a safe pressure magnitude before the final one of said plurality of fasteners is removed; and (d) through an opening that is created by removing said end cap, without removing said outer housing, and without the use of any tool, directly accessing and removing at least one of:

(i) said movable piston;

(ii) said movable driver; and (iii) said sleeve of the working cylinder.

8. The method of claim 7, further comprising:

(a) providing a piston stop at a distal end of said working cylinder, wherein a proximal end of the working cylinder is proximal to said end cap; and (b) through said opening that is created by the removal of said end cap, without removing said outer housing, and without the use of any tool, directly accessing and removing said piston stop.

9. The method of claim 7, further comprising:

(a) providing a spacer that exhibits a plurality of spaced-apart protrusions, said spacer being mounted at a proximal end of said sleeve when said fastener driving tool is properly assembled, wherein a proximal end of the sleeve is proximal to said end cap, and said spacer and protrusions being sized and shaped so as to hold said sleeve in a correct orientation with respect to said end cap after said fastener driving tool has been properly assembled; and (b) through said opening that is created by the removal of said end cap, without removing said outer housing, and without the use of any tool, directly accessing and removing said spacer.

10. The method of claim 9, further comprising:

(a) replacing at least one of the original parts with a new appropriate part, including at least one of said movable piston, said movable driver, said sleeve of the working cylinder, and said spacer;

(b) installing new, or the original, parts for said movable piston, said movable driver, said sleeve of the working cylinder, and said spacer, by the following procedure:

(i) inserting said movable driver and said movable piston through said opening;

(ii) inserting said sleeve through said opening, wherein said sleeve is placed over said movable piston;

(iii) mounting said spacer onto a proximal end of said sleeve;

(iv) attaching said end cap to said storage chamber, using said plurality of fasteners, and during this attaching action, forcing said spacer to be positioned in a correct orientation with respect to said end cap and with respect to said sleeve after said fastener driving tool has been properly assembled; and (c) wherein, all of the above actions for installation are performed without the use of any tool, except for the action of attaching said end cap using said plurality of fasteners.

11. The method of claim 10, further comprising:

(a) attaching an external gas source to said fill valve;

(b) actuating said fill valve to introduce additional pressurized gas from said external gas source into said storage chamber;

(c) refilling said storage chamber with pressurized gas through said fill valve; and (d) detaching said external gas source from said fill valve.

12. A fastener driving tool, comprising:

(a) an outer housing;

(b) a working cylinder that includes a cylindrical sleeve and a movable piston therewithin;

(c) a storage chamber containing pressurized gas that is in fluidic communication with said working cylinder;

(d) a movable driver that is in mechanical communication with said piston at least during a driving stroke;

(e) a piston stop located at a distal end of said sleeve;

(f) an end cap that is attachable/detachable to/from said storage chamber proximal to a high pressure portion of the working cylinder of said fastener driving tool;

(g) a spacer that exhibits a plurality of spaced-apart protrusions, said spacer being mounted at a proximal end of said sleeve, wherein said proximal end of the sleeve is proximal to said end cap, and said spacer and protrusions being sized and shaped so as to hold said sleeve in a correct orientation with respect to said end cap; and (h) a mechanical bottom structure at a distal end of said working cylinder to which a distal end of the storage chamber is in mechanical communication with, and to which a distal end of the sleeve is in mechanical communication with, to thereby enclose said storage chamber to create a pressure vessel;

wherein: a stack-up of said end cap, said spacer, and said sleeve holds the distal end of the sleeve in mechanical communication with said bottom structure of the working cylinder, without the use of internal fasteners.

13. The tool of claim 12, wherein: said end cap is removably secured to at least one of said outer housing and said storage chamber by a plurality of fasteners.

14. The tool of claim 12, further comprising: a seal between said end cap and said storage chamber.

15. The tool of claim 14, wherein: said seal is an O-ring.

* * * * *